J. MAHEU.
BOW FACING OAR.
APPLICATION FILED JAN. 17, 1916.
1,207,584.
Patented Dec. 5, 1916.
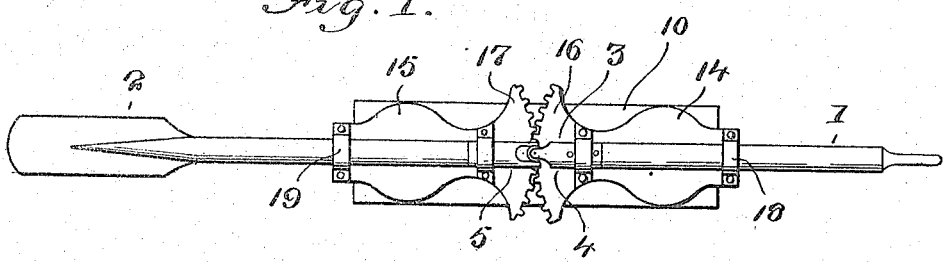
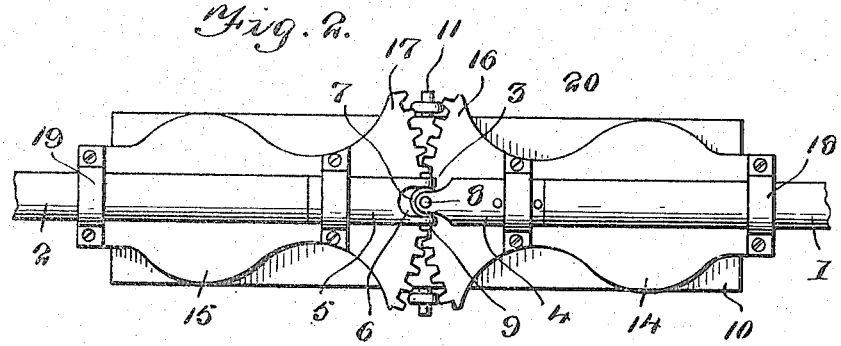
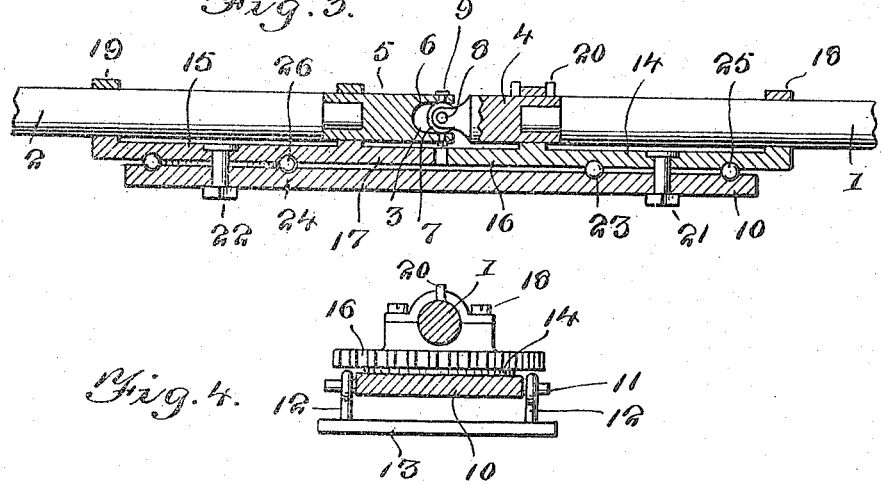
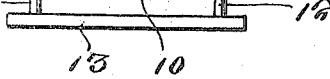
Inventor
Joseph Maheu,
By Victor J. Evans
Attorney
Witnesses
E. R. Ruppert.
J. W. Garner

UNITED STATES PATENT OFFICE.

JOSEPH MAHEU, OF WATERVILLE, MAINE, ASSIGNOR OF ONE-HALF TO NAPOLEON O. MAHEU, OF WATERVILLE, MAINE.

BOW-FACING OAR.

1,207,584.  Specification of Letters Patent.  Patented Dec. 5, 1916.

Application filed January 17, 1916. Serial No. 72,588.

*To all whom it may concern:*

Be it known that I, JOSEPH MAHEU, a subject of the King of England, residing at Waterville, in the county of Kennebec and State of Maine, have invented new and useful Improvements in Bow-Facing Oars, of which the following is a specification.

This invention is an improved oar, the object of the invention being to provide an improved oar which is cheap and simple in construction, is strong and durable, is not likely to get out of order, and which can be used by a rower facing the bow and feathered and otherwise manipulated like an ordinary oar.

The invention consists in the construction, combination and arrangement of devices hereinafter described and claimed.

In the accompanying drawings, Figure 1 is a plan of a bow facing oar constructed and arranged in accordance with my invention. Fig. 2 is a detail plan of the same on a larger scale. Fig. 3 is a detail longitudinal sectional view of the same also on a larger scale. Fig. 4 is a transverse sectional view of the same.

My improved oar comprises a handle or inner member 1 and a blade or outer member 2. These members are connected together for universal angular movement by a suitable universal joint 3. In the form of the invention shown the oar members are provided at their opposing ends with ferrules 4—5 respectively, the opposing ends of which are forked as at 6 and arranged with their respective fork arms at right angles to one another, a ball member 7 being interposed between the forks and being connected to the respective fork arms by pivots 8—9 which are at right angles to each other. Hence the oar may be bent in any direction. A connecting element 10 is also provided which is here shown as an oblong rectangular plate provided at its center with a transversely arranged pivoting pin or bolt 11 which engages bearings 12 in a fixed oar lock 13. Hence the connecting element or plate is pivotally mounted by the oar lock and its pivot 11 for vertical angular movement and is withheld from other pivotal movement.

The members 1—2 of the oar are respectively provided with gear plates 14—15 which are provided at their opposing ends with intermeshing segment gears 16—17. The plate 14 has bearings 18 for the member 1 and the plate 15 has bearings 19 for the member 2, the members being connected as hereinbefore described being thus mounted for turning movement in the bearings of the gear plate to permit feathering of the oar and the member 2 being also mounted for slight longitudinal movements in the bearings 19 to compensate for the angular movement of said members. To prevent the member 1 from moving longitudinally in the bearings 18 said member is provided with pins 20 arranged at opposite sides of the outer bearing 18. The gear plates are respectively pivotally mounted on the connecting plate 10 as at 21—22. Said gear plates and connecting plate are provided with ball races 23—24 on their opposing sides, are respectively concentric with the pivots 21—22, and bearing balls 25—26 operate in said races so that ball bearings are provided for the members of the oar.

It will be understood that by this construction and arrangement of the oar the latter may be operated by a rower facing the bow and may be readily feathered and otherwise manipulated like an ordinary oar.

Having thus described my invention, I claim:—

A bow facing oar comprising a connecting element, inner and outer oar members connected together at their opposing ends for universal angular movement but against relative longitudinal movement, and a pair of intergeared members pivotally mounted on the connecting member and having a pair of bearings spaced from opposite sides of its pivot and in which said oar members are mounted for turning movement, one of said oar members being also longitudinally movable in its bearings and the other being provided with means to prevent longitudinal movement thereof in its bearings.

In testimony whereof I affix my signature in presence of two witnesses.

JOSEPH MAHEU.

Witnesses:
CHAS. F. KIDDER,
E. W. CLAIR.

Copies of this patent may be obtained for five cents each, by addressing the "Commissioner of Patents, Washington, D. C."